US006967326B2

(12) United States Patent
Pai et al.

(10) Patent No.: US 6,967,326 B2
(45) Date of Patent: Nov. 22, 2005

(54) MASS SPECTROMETERS ON WAFER-SUBSTRATES

(75) Inventors: Chien-Shing Pai, Bridgewater, NJ (US); Stanley Pau, Hoboken, NJ (US); Joseph Ashley Taylor, Springfield, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 77 days.

(21) Appl. No.: 10/789,091

(22) Filed: Feb. 27, 2004

(65) Prior Publication Data

US 2005/0189488 A1 Sep. 1, 2005

(51) Int. Cl.[7] ......................... H01J 49/00; B01D 59/44
(52) U.S. Cl. .................... 250/292; 250/281; 250/423 F
(58) Field of Search ............................... 250/292, 281, 250/423 F

(56) References Cited

U.S. PATENT DOCUMENTS

| | | | | |
|---|---|---|---|---|
| 2,939,952 A | | 6/1960 | Paul et al. | 250/41.9 |
| 5,349,186 A | | 9/1994 | Ikonomou et al. | 250/288 |
| 5,501,893 A | | 3/1996 | Laermer et al. | 418/161 |
| 5,541,408 A | * | 7/1996 | Sittler | 250/288 |
| 5,735,720 A | * | 4/1998 | Gartner et al. | 445/24 |
| 5,989,931 A | | 11/1999 | Ghodsian et al. | 438/20 |
| 6,127,680 A | | 10/2000 | Andrien, Jr. et al. | 250/288 |
| 6,140,640 A | | 10/2000 | Wittmer et al. | 250/288 |
| 6,462,337 B1 | | 10/2002 | Li et al. | 250/288 |
| 6,541,767 B1 | | 4/2003 | Kato | 250/288 |
| 6,573,494 B1 | | 6/2003 | Andrien, Jr. et al. | 250/288 |
| 6,683,302 B1 | | 1/2004 | Eriksson | 250/288 |
| 6,870,158 B1 | * | 3/2005 | Blain | 250/292 |
| 2002/0158140 A1 | | 10/2002 | Ahn et al. | 239/102.1 |
| 2003/0213918 A1 | | 11/2003 | Kameoka et al. | 250/425 |

OTHER PUBLICATIONS

U.S. Appl. No. 10/656,432, filed Sep. 5, 2003, Pai et al.
Le Gac, S., et al., "*2 1/2 D Microfabricated Nib-Like Sources for Nanoelectrospray Applications*," 7th Int'l Conference on Miniaturized Chemical and Biochemical Analysis Systems, Squaw Valley, Cal., U.S.A., pp. 1211-1214, Oct. 5-9, 2003.
Svedberg, M., et al., "Fabrication of Open PDMS Electrospray Tips Integrated with Microchannels Using Replication from a Nickel Master," 7th Int'l Conference on Miniaturized Chemical and Biochemical Analysis Systems, Squaw Valley, Cali., U.S.A., pp. 375-378, Oct. 5-9, 2003.
Scheidemann, A.A., et al., "Faraday cup detector array with electronic multiplexing for multichannel mass spectrometry, " J. Vac. Sci. Technol. A 20(3), American Vacuum Society, pp. 597-604, May/Jun. 2002.
Darling, R.B., et al., "Micromachined Faraday Cup Array Using Deep Reactive Ion Etching," Proc. 14th Int. Conf. Micro. Electro Mechanical Systems, (MEMS 2001), pp. 90-93 (Jan. 2001).
Spindt, C.A., "Microfabricated field-emission and field-ionization sources," Surface Science 266, pp. 145-154, (1992).
Smith, S.J., et al., "Recent Developments with the Rotating Field Mass Spectrometer (RFMS) and Nanospray Ionizer," 37 pages, The 4th Harsh-Environment Mass Spectrometry Workshop, St. Petersburg Beach, FL, http://cot.marine.usf.edu/hems/workshop/Workshop%204th/4th_WSprogram2.htm, Oct. 7-10, 2003.

* cited by examiner

*Primary Examiner*—Nikita Wells
*Assistant Examiner*—James J. Leybourne
(74) *Attorney, Agent, or Firm*—John F. McCabe

(57) ABSTRACT

An apparatus includes a semiconductor or dielectric wafer-substrate and first and second multi-layer structures located over the wafer-substrate. The first multi-layer structure includes an ionizer or an electronic ion detector. The second multi-layer structure includes an ion trap having entrance and exit ports. The ionizer or electronic ion detector has a port coupled to one of the ports of the ion trap.

24 Claims, 9 Drawing Sheets

MASS SPECTROMETERS ON WAFER-SUBSTRATES

BACKGROUND

1. Field of the Invention

The invention relates to mass spectrometers and methods for fabricating and operating mass spectrometers.

2. Description of the Related Art

Mass spectrometers are tools for chemical detection and analysis. These tools measure mass-to-charge ratios of particles. From the charge-to-mass ratios, it is often possible to determine the masses of the particles being analyzed.

Conventional mass spectrometers include three devices. The first device ionizes the particles to be analyzed. The second device stores and/or separates the ionized particles according to mass-to-charge ratios. The third device measures the quantities of ionized particles with specific charge-to-mass ratios.

A variety of conventional mass spectrometers use a quadrupole ion trap to store and separate ionized particles according to mass-to-charge ratios. Examples or quadrupole ion traps are described, e.g., in U.S. Pat. No. 2,939,952, issued to W. Paul et al on Jun. 7, 1960 to W. Paul. U.S. Pat. No. 2,939,952 is incorporated herein by reference in its entirety.

Unfortunately, many mass spectrometers use metallic components fabricated by standard metal machining techniques. The metallic components are expensive to manufacture and assemble. The metallic components cause such mass spectrometers to be large and bulky. This later property has limited the widespread application and deployment of such devices.

SUMMARY

Various embodiments provide wafer-substrate based structures for mass spectrometers. Individual mass spectrometers include an ion trap and an ionizer and/or an electronic ion detector. Some of the structures provide arrays of mass spectrometers, e.g., arrays of independently addressable spectrometers. Various embodiments provide methods for fabricating mass spectrometers based on microelectronics processing techniques.

In one aspect, an apparatus includes a semiconductor or dielectric wafer-substrate and first and second multi-layer structures located over the wafer-substrate. The first multi-layer structure includes an ionizer or an electronic ion detector. The second multi-layer structure includes an ion trap having entrance and exit ports. The ionizer or electronic ion detector has a port coupled to one of the ports of the ion trap.

In another aspect, an apparatus includes first and second semiconductor or dielectric wafer-substrates. The first wafer-substrate includes a first multi-layer structure located thereon. The first multi-layer structure has an ionizer or an electronic ion detector therein. The second wafer-substrate includes a second multi-layer structure located thereon. The second multi-layer structure has therein an ion trap with entrance and exit ports. The ionizer or electronic ion detector has a port coupled to one of the ports of the ion trap.

In another aspect, a method includes fabricating a first multi-layer structure for an array of ionizers or electronic ion detectors on a wafer-substrate, depositing a layer of sacrificial material on the first multi-layer structure, and planarizing the layer of sacrificial material. The method also includes fabricating a second multi-layer structure over the planarized layer of sacrificial material and then, removing the sacrificial material. The second multi-layer structure includes an array of ion traps.

In another aspect, a method includes fabricating a multi-layer structure for an array of ionizers or electronic ion detectors on a first wafer-substrate and fabricating a multi-layer structure for an array of ion traps on a second wafer-substrate. The method includes then, putting the wafer-substrates together such that ports of the ion traps are coupled to ports of the ionizers or electronic ion detectors.

Some embodiments provide high-density mass spectrometers. Such devices may be advantageous in analyzing chemical gases.

In the Figures, dimensions of some features may be magnified or shrunk in relation to sizes of other features.

In the Figures and text, like reference numbers indicate features with similar functions or properties.

DETAILED DESCRIPTION OF EMBODIMENTS

This patent application incorporates by reference in its entirety co-pending U.S. patent application Ser. No. 10/656,432, filed Sep. 5, 2003, by C. S. Pai and S. Pau, i.e., herein referred to as the '432 application.

Herein, various embodiments are described more fully with reference to the accompanying figures and detailed description. The invention may, however, be embodied in various forms and is not limited to the embodiments described herein.

Figure 1:
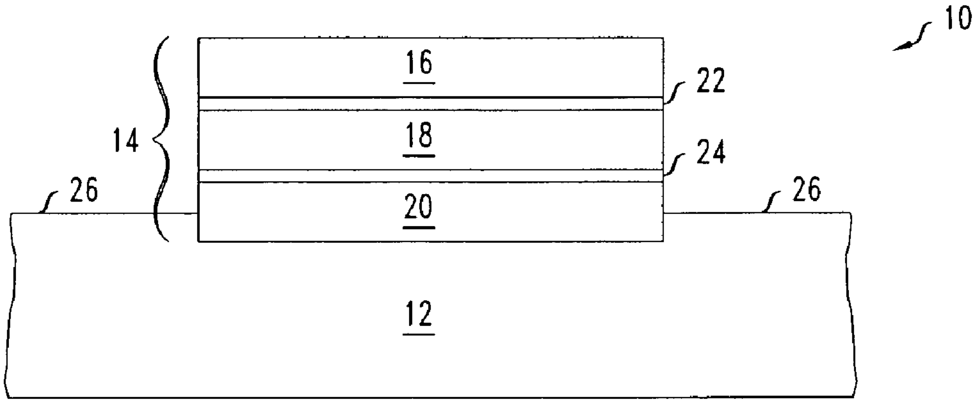
FIG. 1 is a cross-sectional view of a monolithic structure for a mass spectrometer on a single wafer-substrate.

FIG. 1 shows a monolithic structure 10 for a mass spectrometer. The monolithic structure 10 is located on wafer-substrate 12, e.g., a standard silicon wafer or silica-glass wafer. The monolithic structure 10 includes a vertical layer-stack 14 on and over the wafer-substrate 12. The layer-stack 14 includes functional top, middle, and bottom multi-layer structures 16, 18, 20, and non-functional insulating layers 22, 24. The top multi-layer structure 16 includes an array of ionizers (not shown). The ionizers are able to ionize molecules in a low-pressure gaseous state when appropriately voltage biased. The middle multi-layer structure 18 includes an array of quadrupole micro-ion traps (not shown). The ion traps are capable of storing ionized molecules and ejecting stored ionized molecules sequentially according to charge-to-mass ratio when appropriately driven by a radio frequency (RF) voltage source. The bottom multi-layer structure 20 includes an array of electronic ion detectors (not shown). The ion detectors are able to count impacts of ionized particles therein, e.g., by measurements of accumulated charges in capacitors. The insulating layers 22, 24 provide electrical insulation between the pair of functional multi-layer structures 16, 18 and between the pair of functional multi-layer structures 18, 20. In various embodiments, the bottom of the vertical stack 14 may be above, below, or at the same vertical level as planar top surface 26 of the wafer-substrate 12.

Herein, monolithic structure refers to a structure that is fabricated on a single wafer-substrate.

Herein, array refers to a one-dimensional (1D) or a two-dimensional (2D) arrangement of objects that may or may not be separated by the same distances along the 1 or 2 directions between the objects.

Figure 2:
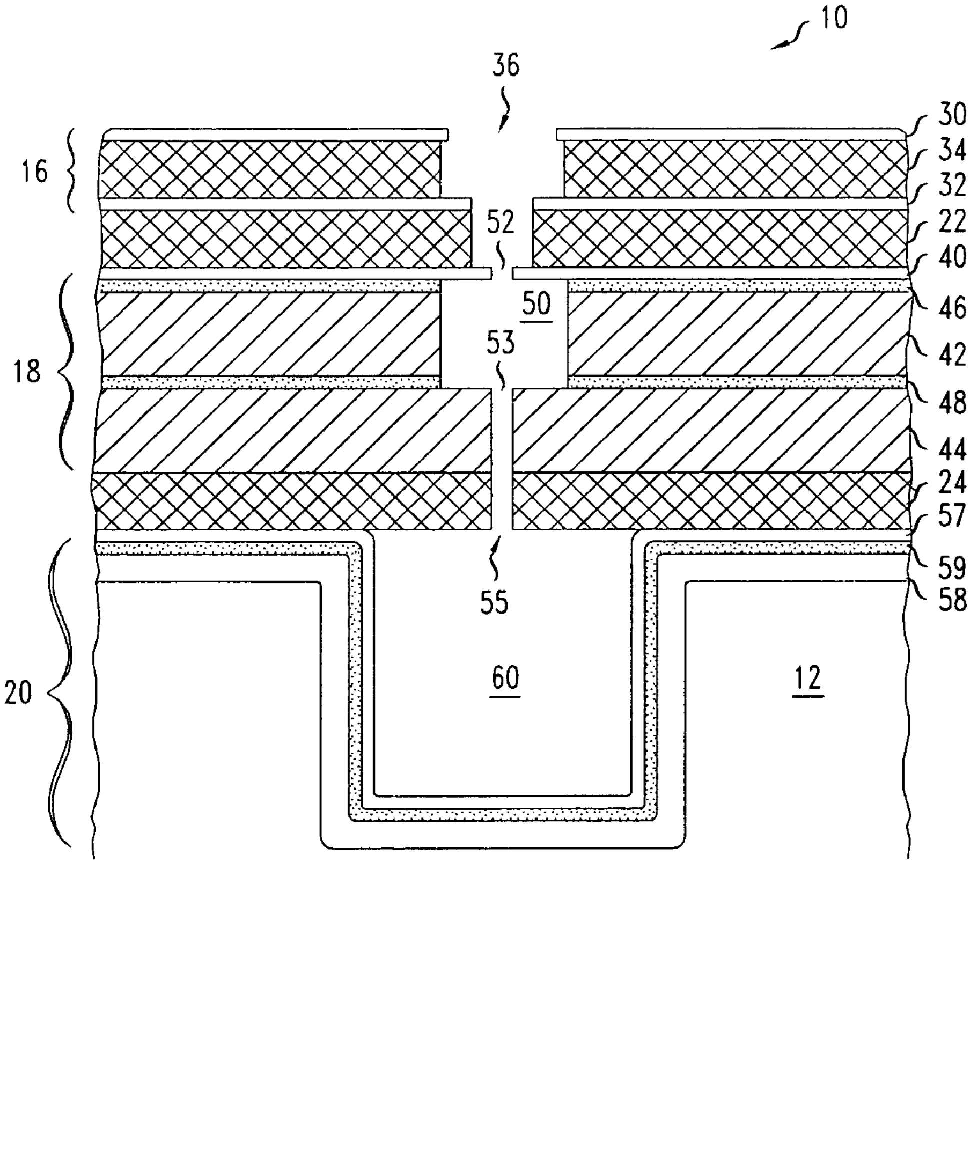
FIG. 2 is a cross-sectional view of a specific embodiment of the monolithic structure of FIG. 1.

FIG. 2 shows a portion of monolithic structure 10 of FIG. 1 in more detail. The portion is a lateral region including an ionizer in top multi-layer structure 16, an associated ion trap in middle multi-layer structure 18, and an associated electronic ion detector in bottom multi-layer structure 20. The associated ionizer, ion trap, and electronic ion detector function as a single mass spectrometer. Various embodiments of the monolithic structure 10 provide electrical connections (not shown) that enable ion storing, stored-ion ejecting, and ion counting for separate mass spectrometers as individual and/or parallel units.

Top multi-layer structure 16 includes a vertical layer-stack. The vertical layer-stack includes a pair of conducting layers 30, 32 and an insulating layer 34 interposed between the conducting layers 30, 32. The conducting layers 30, 32 have thicknesses of about 0.1–0.2 μm and are metal, e.g., titanium (Ti), tungsten (W), or aluminum (Al), titanium nitride (TiN), conducting silicide, or heavily doped polycrystalline silicon (polysilicon) layers. The insulating layer 34 has a thickness of about 0.3–1.0 μm and is dielectric layer, e.g., a silicon dioxide or a silicon nitride layer. The vertical stack also includes an array of vertical cylindrical holes 36 that traverse both the conducting layers 30, 32 and the insulating layer 34. Exemplary holes 36 have external entrance ports with diameters of about 0.5-2.0 μm and internal exit ports with diameters of about 0.3-1.0 μm.

Top multi-layer structure 16 is electrically insulated from middle multi-layer structure 18 by insulating layer 22. The insulating layer 22 has a thickness of about 1–10 μm and is, e.g., silicon dioxide or silicon nitride. The insulating layer 22 is also traversed by vertical extensions of holes 36. In the insulating layer 22, the holes 36 form cylindrical channels by which ionized particles can pass between ionizers in the top multi-layer structure 16 to ion traps in the middle multi-layer structure 18.

In top multi-layer structure 16, field ionizers produce strong electric fields in holes 36 in response to moderate voltages being applied across conducting layers 30 and 32. For example, voltages of about 100 volts should be able to produce electric field strengths of around 100 mega-volts per meter in the holes 36. Such strong electric field strengths can ionize molecules of low-density gases as the molecules pass through the holes 36. The ionized particles pass into ion traps of multi-layer structure 18 for storage.

Other embodiments of top multi-layer structure 16 (not shown) of FIG. 1 have different types of ionizers such as field emitter arrays. Other ionizers may be used in the top multi-layer structure 16. U.S. Pat. No. 5,989,931 is incorporated herein by reference in its entirety and describes some other ionizer designs.

Middle multi-layer structure 18 includes a second vertical layer-stack for an array of quadrupole ion traps. The second vertical layer-stack includes top, middle, and bottom conducting layers 40, 42, 44 and relatively thinner dielectric layers 46, 48 interposed between the conducting layers 40, 42, 44. Exemplary conducting layers 40, 42, 44 have thicknesses of about 0.2 μm to several μm and are formed of metal, heavily doped semiconductor, and/or conducting silicide. Exemplary dielectric layers 46, 48 have a thickness of about 0.1 μm or less and are formed of dielectrics such as silicon nitride, silicon dioxide, or a dielectric polymer.

FIG. 2 shows a lateral region of the vertical layer-stack for one ion trap. Each ion trap includes a top end cap electrode, a central electrode, and a bottom end cap electrode. The top and bottom end cap electrodes include entrance and exit ports 52, 53 that allow introducing ions into and ejecting ions from the ion trap. The central electrode has a right circularly cylindrical cavity 50 whose axis is perpendicular to the conducting layers 40, 42, 44. The entrance and exit ports 52, 53 are circular and centered along a vertical axis of the associated cavity 50 of the central electrode. The entrance and exit ports 52, 53 typically have smaller diameters than the associated cavities 50 so that electric field distributions inside the cavity 50 are not substantially perturbed from distributions that would exist if the entrance and exit ports 52, 53 were absent. In some embodiments, it may however, be desirable for fabrication reasons to make either port 52, 53 with the same diameter as the associated cavity 50.

In middle multi-layer structure 18, right circularly cylindrical cavities 50 function as ion trapping and storage cavities. In ion storage cavities, quadrupole electric field distributions are often preferable. Field distributions are, in part, determined by cavity-shapes and, in part, determined by a cavity-biasing scheme. With respect to cavity-shape, the cavities 50 have height-to-diameter ratios of about 0.83 to about 1.0 and preferably said ratios are about 0.897. Separate ion traps may have the same or different dimensions. With respect to cavity-biasing schemes, voltage biasing includes applying an RF voltage to the central electrode while grounding the two end cap electrodes to store ions in one of the cavities 50 and ramping the intensity of the RF voltage to eject ions for the cavities 50 according to charge-to-mass ratios.

In middle multi-layer structure 18, the top end cap, central, and bottom end cap electrodes also connect to electrical contacts (not shown) that apply RF voltages and ground electrodes of individual ion traps. The configurations of said electrical contacts may enable driving separate ion traps individually or driving individual ion traps in parallel.

Middle multi-layer structure 18 is electrically insulated from bottom multi- layer structure 20 by insulating layer 24. Exemplary insulating layers 24 have a thickness of about 1–10 μm of a dielectric such as silicon dioxide or silicon nitride. The insulating layer 24 is vertically traversed by cylindrical holes 55 that are aligned to connect ion traps to electronic ion detectors in the bottom multi-layer structure 20. In some embodiments, the exit port 53 of each ion trap connects to a separate electronic ion detector in the bottom multi-layer structure 20. In other embodiments, the exit ports 53 of several ion traps, e.g., up to 100 ion traps, connects to the same electronic ion detector in the bottom multi-layer structure 20.

Bottom multi-layer structure 20 also includes a layer-stack. The layer-stack includes upper and lower conducting layers 57, 58 and a dielectric layer 59 interposed between the conducting layers 57, 58. The conducting layers 57, 58 are formed of a metal such as Ti, W, or Al, a conducting silicide, or a heavily doped polysilicon. The upper conducting layer 57 has a thickness of about 0.1–0.5 μm. The dielectric layer 59 has a thickness of about 0.05–0.2 μm and may be formed of silicon dioxide, silicon nitride, or any other appropriate capacitor dielectric.

In bottom multi-layer structure 20, the layer-stack forms an array of cup-shaped capacitors. The capacitors have upper and lower plates formed by upper and lower conducting layers 57, 58, respectively. The capacitors have cup-shaped central cavities 60 accessible to exit ports 53 of one or more ion traps. In particular, ion traps can eject ions via exit ports 53 such that the ions impact the upper plates causing a measurable change in the charge in the associated capacitor. Each capacitor functions as a Faraday-type ion detector.

In other monolithic mass spectrometers, the functional multi-layer structures 16, 18, 20 have a different order.

Figure 3:
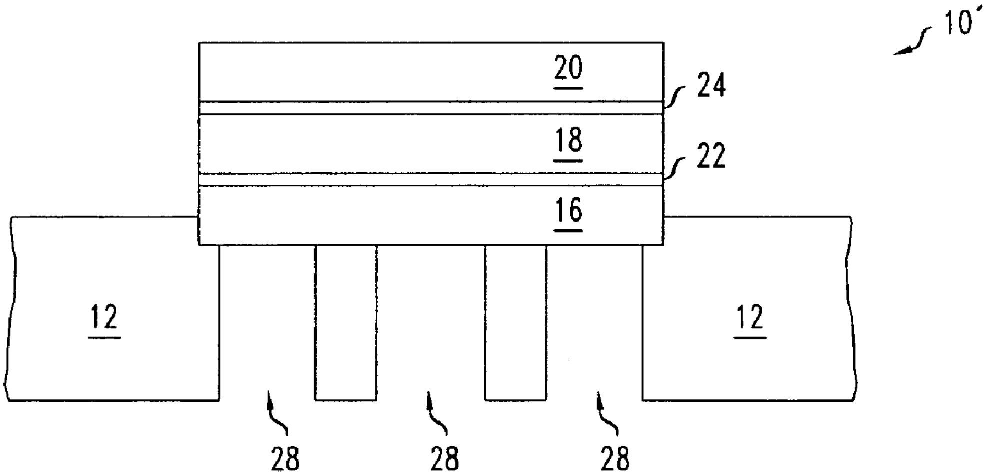
FIG. 3 is a cross-sectional view of an alternate monolithic structure for a mass spectrometer on a single wafer-substrate.

FIG. 3 shows a monolithic structure 10' for a mass spectrometer in which the order of functional multi-layer structures 16, 18, 20 is vertically reversed with respect to the layer-order in monolithic structure 10 of FIG. 1. In particular, the multi-layer structure 16 for an array of ionizers is closest to the wafer-substrate 12 and the multi-layer structure 20 for an array of electronic ion detectors is farthest from the wafer-substrate 12 in the monolithic structure 10'. The monolithic structure 10' also includes deep backside vias 28 that traverse the entire thickness of the wafer-substrate 12. The vias 28 provide entrance ports to ionizers in the multi-layer structure 16. Exemplary methods for making such deep vias 28 are, e.g., described in the '432 application and in U.S. Pat. No. 5,501,893, issued Mar. 26, 1996 to F. Laermer et al ('893). The '893 patent is incorporated by reference herein in its entirety.

Figure 4:
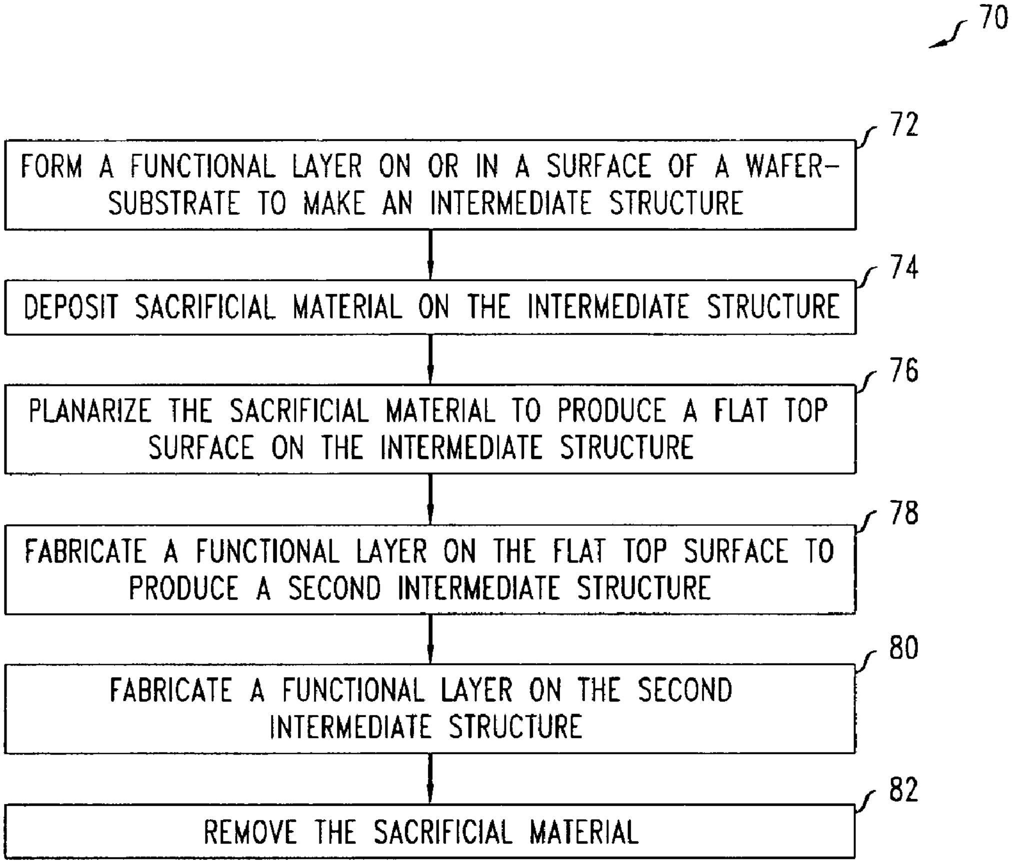
FIG. 4 is a flow chart illustrating a fabrication method for the monolithic structure of FIG. 1.

FIG. 4 illustrates a method 70 for fabricating monolithic structure 10 of FIGS. 1 and 2 via microelectronics fabrication techniques.

Method 70 includes forming a bottom functional layer, i.e., multi-layer structure 20, on or in a surface of wafer-substrate 12 to produce an intermediate structure (step 72). The intermediate structure includes an array of electronic ion detectors, e.g., Faraday detectors or micro-channel plate detectors. The individual ion detectors have non-trivial surface topographies and thus, produce an array of holes and/or bumps on a top surface of the intermediate structure.

Method 70 includes depositing a sacrificial material on the intermediate structure (step 74). The sacrificial material fills holes and/or covers bumps on the top surface of the intermediate structure. An exemplary sacrificial material is amorphous or polycrystalline silicon. Amorphous silicon may be deposited by a plasma-enhanced chemical vapor deposition (PECVD) at 250° C.–400° C., a sputtering deposition at 20° C.–250° C., or an evaporation-deposition. Amorphous silicon is advantageous over polycrystalline silicon when lower fabrication temperatures are needed due to temperature-sensitivities of other materials.

Herein, sacrificial materials are materials temporarily applied to intermediate structures to enable producing flat surfaces thereon. After fabrication on the resulting flat surfaces, the sacrificial materials are removed with a vapor or liquid etchant, or a solvent. Exemplary sacrificial materials include semiconductors such as amorphous silicon, polycrystalline silicon, spin-on precursors for polymers, and dielectrics such as silica-glass.

Method 70 includes planarization of the sacrificial material to produce a flat top surface on the intermediate structure (step 76). The flat top surface is suitable for construction of a further multi-layer structure thereon. For sacrificial amorphous silicon, the planarization involves performing a chemical mechanical polish (CMP). The CMP produces a flat top surface, because the chemical polishing agent selectively removes amorphous silicon and stops on the material underlying the sacrificial amorphous silicon.

The method 70 includes fabricating a middle functional layer, i.e., multi-layer structure 18, on the previously produced flat top surface to produce a second intermediate structure (step 78). The second intermediate structure includes both an array of ion detectors and an array of ion traps. Forming the second intermediate structure includes conventional steps to ensure alignment of the ion traps over associated ones of the ion detectors. Fabrication of the second intermediate structure includes filling cavities in the ion traps with a sacrificial material and planarizing the resulting top surface. This sacrificial material provides for an intermediate flat top surface suitable for fabricating remaining portions of the ion traps. Thus, both the ion traps and the electronic ion detectors are filled with a sacrificial material in the second intermediate structure. Preferably, the fabrication produces trapping cavity with smooth vertical sidewalls. Forming the middle functional layer of a fine grain metal layer and using an appropriate dry etch chemistry improves the smoothness of the sidewall. Roughness along the walls of the trapping cavity could otherwise perturb electric field distributions in the trapping cavities of the ion traps.

The method 70 includes fabricating a top functional layer, i.e., top multi-layer structure 16, on the second intermediate structure (step 80). Fabrication of the top layer includes aligning the array of ionizers so that ions will be transmitted to entrance ports of ion traps of middle functional layer.

The method 70 includes removing sacrificial material from the interiors of the ion traps and electronic ion detectors (step 82). For sacrificial polycrystalline silicon, a gaseous chemical etchant such as to $XeF_2$ gas can be used to perform the removal. In particular, such a removal involves performing repetitions of a removal process. The removal process includes exposing the top functional layer to $XeF_2$ gas at a pressure of about 2.9 Torr for about 10 seconds and then, pumping out resulting gases. During the treatments, the $XeF_2$ gas passes through channels of the top layer and reacts with sacrificial amorphous silicon in the middle and bottom functional layers. For micrometer-size mass spectrometers, about 100 or more repetitions of the treatment are probably required to remove the sacrificial amorphous silicon.

Some embodiments of method 70 also include performing a backside deep etch of the monolithic structure 10 to form exit ports from the electronic ion detectors. Exemplary methods for performing such deep etches of wafer substrates are, e.g., described in the incorporated '432 patent application and the '893 patent.

Other mass spectrometers are fabricated in multiple wafer-substrate modules.

Figure 5:
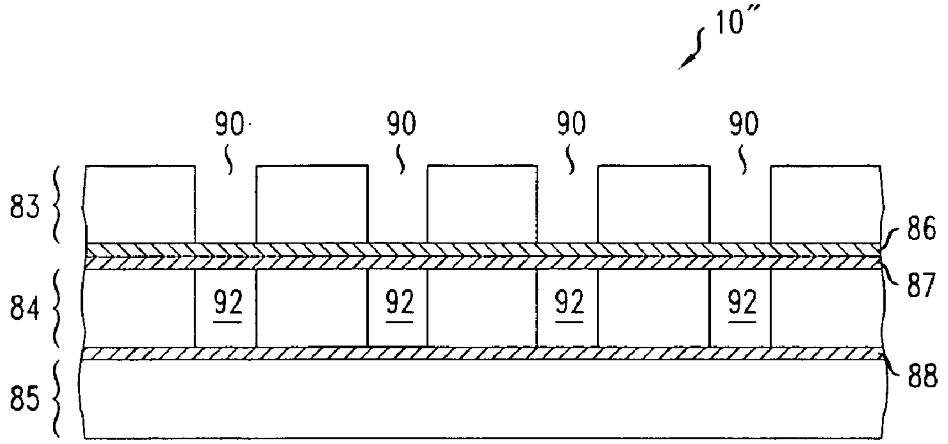
FIG. 5 is a cross-sectional view of a multiple wafer-substrate module for a mass spectrometer.

FIG. 5 shows a structure 10" for a mass spectrometer fabricated in surface-bonded wafer-substrates 83–85. Each wafer-substrate 83–85 has a functional multi-layer structure 86–88 constructed on a surface thereof. In the structure 10", the top, middle, and bottom multi-layer structures 86–88 include arrays of ionizers, ion traps, and Faraday detectors, respectively. In structure 10", the top, middle, and bottom multi-layer structures 86–88 have forms analogous to multi-layer structure 16 of FIG. 2; to layer 22 and multi-layer structure 18 of FIG. 2; and to layer 24 and multi-layer structure 20 of FIG. 2, respectively.

Top and middle wafer-substrates 86, 87 also have arrays of channels 90, 92 that traverse the widths of the wafer-substrates 86, 87. The channels 90 provide conduits in which external particles can move into ionizers in the multi-layer structure 86. The channels 92 provide conduits for ion-propagation between exit ports of ion traps in the multi-layer structure 87 and entrance ports to ion detectors in multi-layer structure 88. The alignment and bonding of wafer-substrates 83–84 ensures that the exit ports for the ionizers in the multi-layer structure 86 align with the entrance ports for the ion traps in multi-layer structure 87. The alignment and bonding of wafer-substrates 84–85 ensures that the channels 92 from exit ports of the ion traps in the multi-layer structure 87 align with entrance ports for the ion detectors in multi-layer structure 88. The bonding process may use epoxy, polyimide, or a fusion process to bond the wafer-substrates 83–85. The alignment and bonding can be performed at either the chip level or the wafer level by using an aligner such as that manufactured by Suss MicroTec Inc. of 228 SUSS Drive, Waterbury Center, Vt. 05677-0157, USA.

Figure 6:
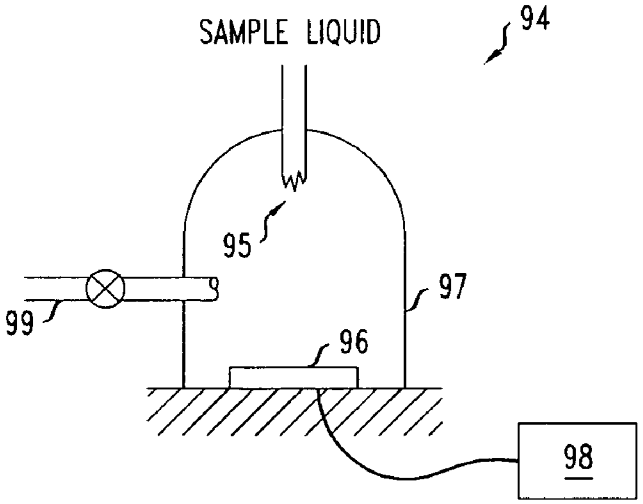
FIG. 6 shows an analyzer that incorporates a mass spectrometer having a structure shown in FIGS. 1–3 or 5.

FIG. 6 shows a chemical analyzer 94, e.g., a vapor analyzer. The chemical analyzer 94 includes one or more nanometer-size electrospray tips 95; a mass spectrometer 96; a vacuum container 97; a programmable computer 98; and a vacuum inlet 99. The one or more electrospray tip 94 convert an input liquid sample into molecular spray in the vacuum container 97. U.S. Patent Publication No. 2002/0158140, by K. H. Ahn et al, published Oct. 31, 2002, and U.S. Patent Publication No. 2003/0213918, by J. Kameoka et al, published Nov. 20, 2003 describe exemplary electrospray tips. Both these U.S. Patent Publications are incorporated herein by reference in their entirety. The mass spectrometer 96 is one of the electrically controllable structures 10, 10', 10'' of FIG. 1, 3, or 5. The computer 98 is programmed to control ionizers and ion traps of the mass spectrometer 96, receives particle count data from the ion detectors of the mass spectrometer 96, and analyzes said data to determine particle charge-to-mass ratios.

Figure 7:
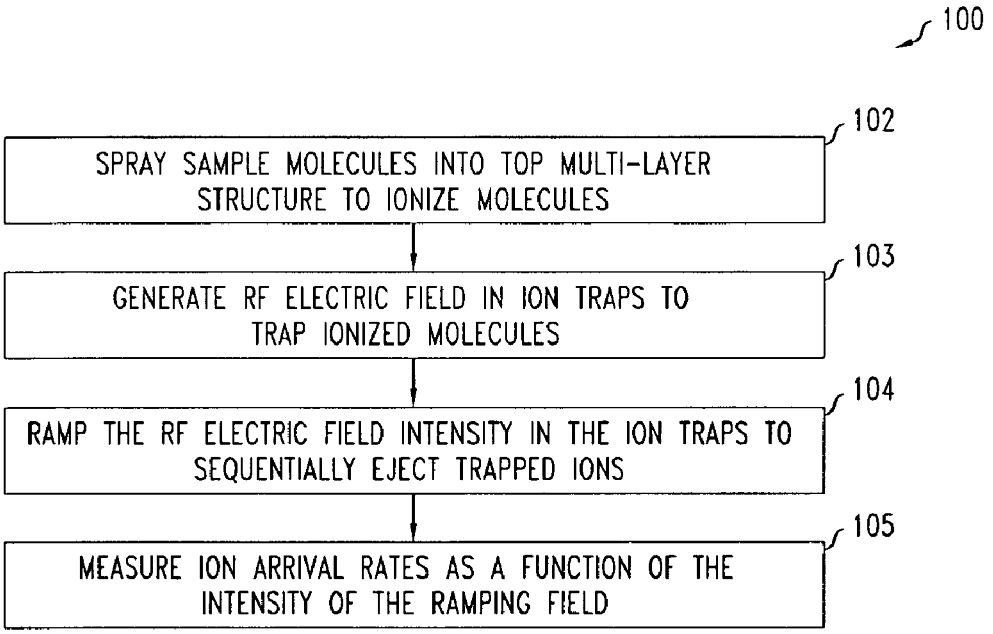
FIG. 7 is a flow chart illustrating a method of operating the analyzer of FIG. 6.

FIG. 7 illustrates a method 100 for operating chemical analyzer 94 of Figure 6. The method 100 includes spraying sample molecules into a multi-layer structure for mass spectrometer 96 such that electric fields in ionizers of a top multi-layer structure 16 in mass spectrometer 96 ionize sample molecules entering therein (step 102). During the spraying, the total gas pressure is kept low enough to avoid electrical arcing between voltage biased metal layers of the ionizers, e.g., metal layers 30, 32 of the multi-layer structure 16 of FIG. 2. To avoid such arcing, the total pressure should be low enough so that molecular mean free paths are larger that distances between voltage-biased metal layers. The method 100 includes generating an RF electric field in ion traps of a middle multi-layer structure 18 in the mass spectrometer 96 such that some ionized molecules become trapped in said ion traps (step 103). During the trapping, low pressure Helium (He) may be used to aid in relaxing ions into stable trapping orbits inside ion trapping cavities 50. The use of low pressure He to aid in trapping ions is, e.g., described in the '432 application. The method 100 includes ramping the RF electric field intensity in one or more of the ion traps such that trapped particles are sequentially ejected from the ion traps according to their charge-to-mass ratios (step 104). Different ion traps may be ramped together, i.e., to produce larger ion fluxes, or separately, i.e., to examine different parts of the charge-to-mass spectrum. The method 100 includes measuring ion arrival rates in electronic ion detectors of a bottom multi-layer structure 20 in the mass spectrometer 96 as a function of the intensity of the ramping RF field (step 105). The ion detectors may be addressed together, e.g., to measure larger ion fluxes, or individually, e.g., to enable measuring numbers of ions in separate charge-to-mass ratio regions. From ramp electric field intensities and measurements of numbers of ejected ions, the spectrum of charge-to-mass ratios for the ionized sample molecules can be determined. The steps of method 100 can also be repeated for purpose of signal averaging to improve signal to noise ratio. After a data run, vacuum inlet 99 pumps out the vacuum chamber 97 to remove sample molecules accumulated in the ion traps and electronic ion detectors of the mass spectrometer 96.

EXAMPLE 1

Figure 8A:
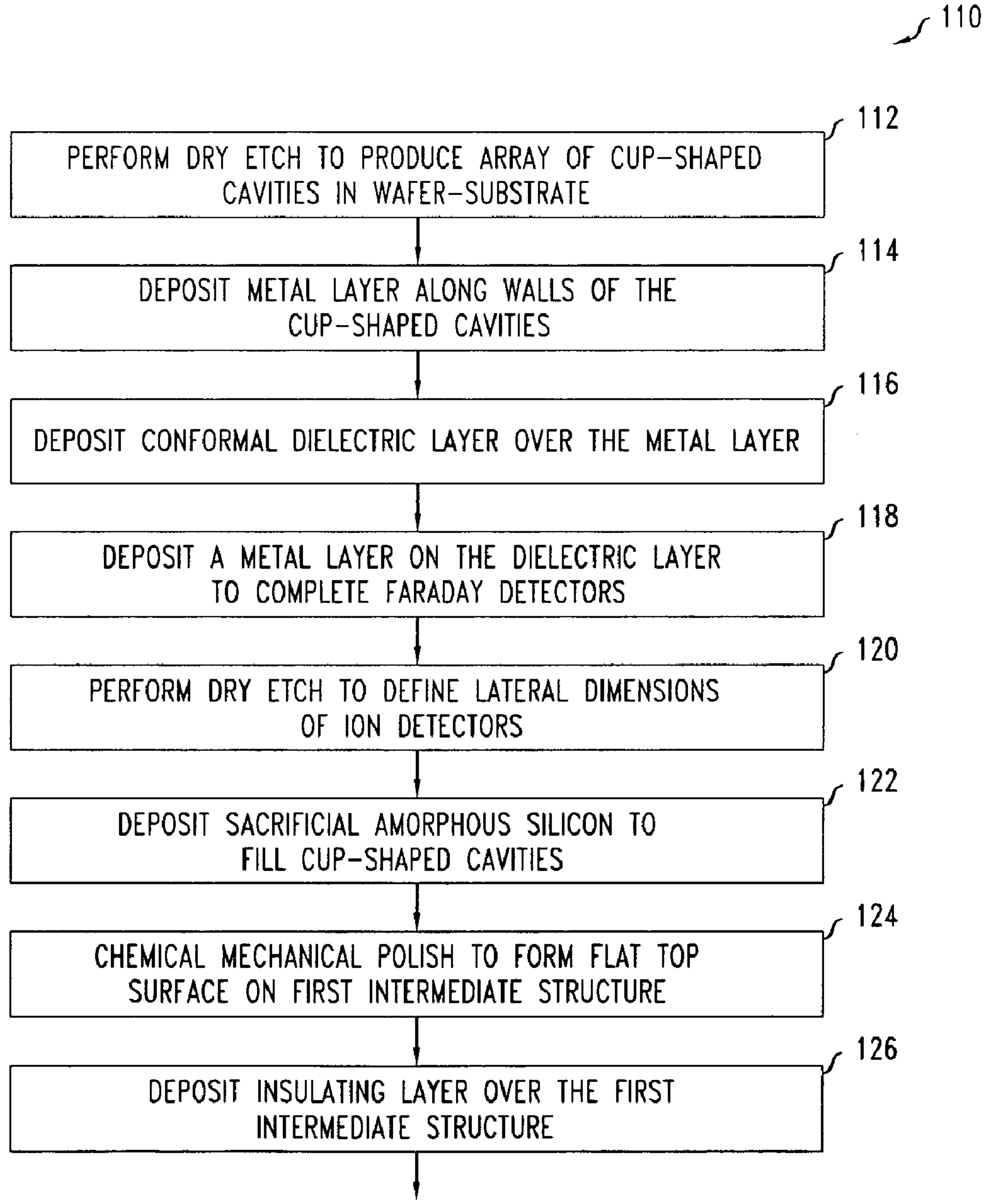
FIGS. 8A–8C show a flow chart illustrating a method for fabricating the monolithic structure of FIG. 2.
Figure 8B:
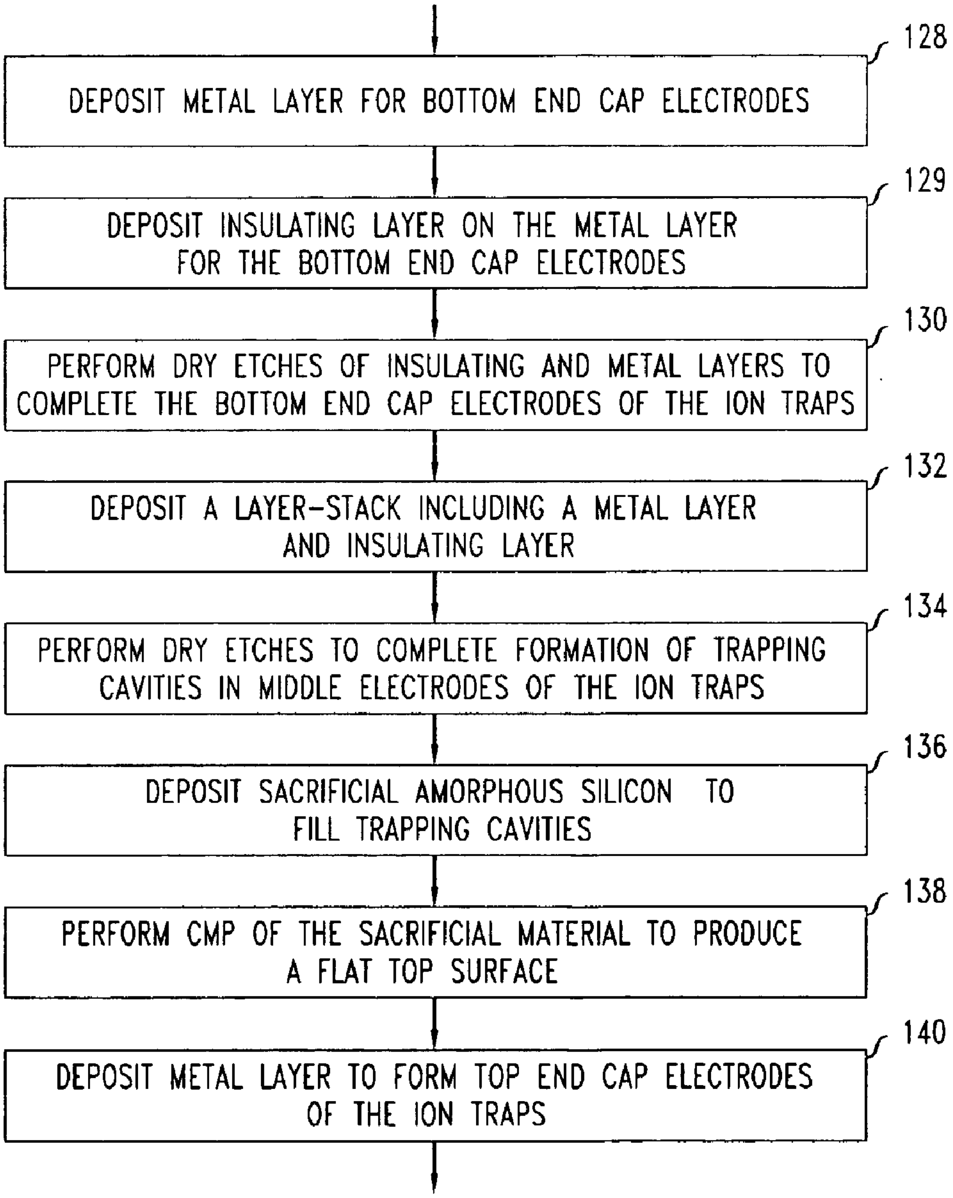
Figure 8C:
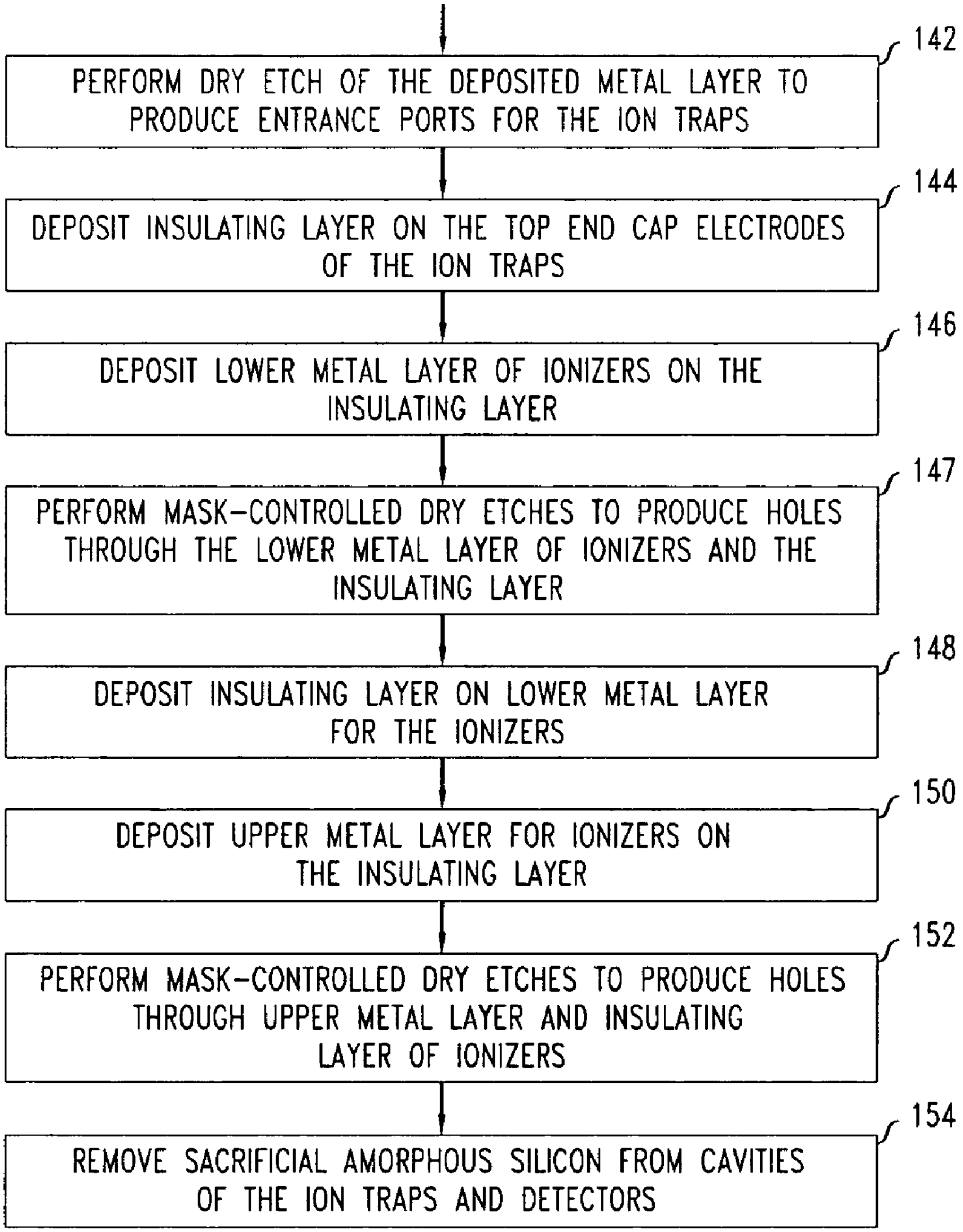

FIGS. 8A–8C illustrate an exemplary method 110 for fabricating monolithic structure 10 of FIG. 2.

Method 110 includes a first sequence of steps for forming an embodiment of multi-layer structure 20 that includes an array of Faraday detectors.

The first sequence includes a mask-controlled dry etch that produces an array of cup-shaped cavities in a top surface of wafer-substrate 12, e.g., a silicon wafer (step 112). An exemplary dry etch is a reactive ion plasma etch (RIE) controlled by a standard photoresist mask. Exemplary cup-shaped cavities are circular and have depths of about 5–100 $\mu$m or more and diameters of about 0.5–2.0 $\mu$m or more.

The first sequence includes a deposition of aluminum (Al) to form a lower conducting layer 58 along side and bottom walls of the cup-shaped cavities (step 114). The Al deposition may be a physical vapor deposition (PVD), a sputtering deposition at 20° C.–250° C., or an evaporation-deposition.

The first sequence includes a deposition that produces a conformal insulating layer 59 over the lower conducting layer 58 (step 116). The insulating layer 59 may be a $SiO_2$ layer with a thickness of about 0.05–0.2 $\mu$m. An exemplary process for depositing such a $SiO_2$ layer is a plasma enhanced chemical vapor deposition (PECVD) at about 250° C.–400° C. The dielectric of insulating layer 59 may also be a material with high dielectric constant.

The first sequence includes a second deposition that produces an upper conducting layer 57 on insulating layer 59 (step 118). An exemplary upper conducting layer 57 is a 0.1–0.5 $\mu$m thick layer of Al. The deposition of the layer of Al involves any of the processes described with respect to step 114.

The first sequence also includes one or several conventional lithographic mask-controlled dry etches of conducting and insulating layers 58, 59, and 57 (step 120). The etches define the lateral dimensions of the Faraday-type ion detectors on substrate 12.

Method 110 includes a second sequence of steps to produce a flat top surface over the ion detectors. The flat top surface is suitable for further micro-fabrication.

The second sequence includes a deposition of sacrificial amorphous silicon that fills the cup-shaped cavities 60 cleared by the previous dry etch, e.g., cavities of Faraday detectors (step 122). The deposition of amorphous silicon (Si) may involve a PECVD of Si at 250° C.–400° C., a sputtering deposition of Si at 20° C.–250° C., or an evaporation-deposition of Si. The deposition of the sacrificial amorphous silicon produces a first intermediate structure with a bumpy or hole-pocked top surface. The rough top surface results from the nontrivial topography of the underlying array of Faraday detectors.

The second sequence includes a chemical mechanical polish (CMP) of the rough top surface of the intermediate structure (step 124). The CMP uses a chemical polishing agent that selectively removes sacrificial amorphous silicon and stops on the dielectric of underlying metal layer 57. Due to this polishing selectivity, the CMP produces a flat top surface on the intermediate structure.

Method 110 includes a third sequence of steps that fabricate insulating layer 124 and an array of ion traps over the previously prepared first intermediate structure with the Faraday detectors.

The third sequence includes a deposition that produces insulating layer 24 on the flat top surface of the first intermediate structure, i.e., over the array of ion detectors (step 126). An exemplary insulating layer 24 is a 1–10 μm thick layer of $SiO_2$. An exemplary process for depositing the layer of $SiO_2$ is the PECVD process described with respect to step 116.

The third sequence includes a deposition of a lower conducting layer 44 on the flat top surface on the insulating layer 24 (step 128). An exemplary lower conducting layer 44 is a 0.3 μm thick layer of Al. An exemplary conducting layer 44 of Al may be deposited by one of the processes described with respect to step 114.

The third sequence also includes a deposition that produces insulating layer 48 (step 129). Exemplary insulating layers 48 are layers of $SiO_2$ with thicknesses of about 0.1 μm. Exemplary processes for depositing the layer of $SiO_2$ have been described with respect to steps 116.

The third sequence includes one or more mask-controlled dry etches of insulating layer 48, conducting layer 44, and insulating layer 24 to produce exit ports 53 thereby completing bottom end cap electrodes of ion traps (step 130). For this step, an exemplary etch is a RIE plasma etch that removes Al and also removes the dielectric of insulating layers 48, 24 stopping on the underlying sacrificial amorphous silicon. For trapping cavities 50 with diameters of about 1 μm, exemplary diameters for the exit ports 53 are about 0.33 μm or less.

The third sequence includes a series of depositions that produce a layer-stack including conducting layer 42 and insulating layer 46 (step 132). An exemplary conducting layer 42 is a layer of Al having a thickness of about 1.0 μm. Exemplary insulating layers 46 are layers of $SiO_2$ with thicknesses of about 0.1 μm. Exemplary processes for depositing the layers 42, 46 of Al and $SiO_2$ have been described with respect to steps 114 and 116.

The third sequence includes a series of etches that completes formation of trapping cavities 50 in conducting layer 42 and re-opens exit ports 53 in conducting layer 44 (step 134). The series includes a mask-controlled dry etch that removes exposed portions of insulating layer 46 and a mask-controlled dry etch that removes portions of conducting layer 42 and stops on underlying insulating layer 48. The series also includes, e.g., a mask-controlled dry etch that removes exposed portions of the insulating layer 48 and stops on Al and amorphous silicon thereby re-opening the exit ports 53. The etches produce circularly cylindrical trapping cavities with height-to-diameter ratios in the range of [0.83, 1.00] and preferably, of about 0.897. Here, the height includes heights through the conducting and insulating layers 42, 46, 48.

The third sequence includes a second deposition of sacrificial amorphous silicon to fill trapping cavities 50 of the ion traps (step 136). Exemplary processes for such a deposition were described with respect to step 122. The deposition produces a non-flat top surface due to the topography of the underlying trapping cavities 50.

The third sequence includes a CMP of the sacrificial material to produce a flat top surface (step 138). The CMP uses, e.g., a chemical agent that selectively removes sacrificial amorphous silicon and stops on underlying $SiO_2$. For that reason, the CMP again produces a smooth, flat, top surface suitable for further fabrication thereon.

The third sequence includes a deposition of conducting layer 40 to form top end cap electrodes of the ion traps (step 140). An exemplary conducting layer 40 is a 0.3 μm thick layer of Al, which is deposited according to any process described with respect to step 114.

The third sequence also includes a mask-controlled dry etch of conducting layer 40 to produce entrance ports 52 for the ion traps thereby completing top end cap electrodes of the ion traps (step 142).

Method 110 includes a fourth sequence of steps to form top multi-layer structure 16, which includes an array of field ionizers.

The fourth sequence includes depositing insulating layer 22 on the top end cap electrodes of ion traps (step 144). An exemplary insulating layer 22 is a 1–10 μm thick layer of $SiO_2$, which may be deposited by processes already described.

The fourth sequence includes depositing lower conducting layer 32 on insulating layer 22 (step 146). An exemplary conducting layer 32 is a 0.2 μm thick layer of Al deposited according to any of the processes described with respect to step 114.

The fourth sequence includes one or more mask-controlled dry etches that produce circular-shaped holes through lower conducting layer 32 and insulating layer 22 (step 147). Exemplary dry etches produce a holes diameters of about 0.3–1.0 μm in the lower layers 32, 22.

The fourth sequence includes depositing insulating layer 34 on conducting layer 32 (step 148). An exemplary insulating layer is a 0.3–1.0 μm thick layer of $SiO_2$ deposited by a process already described with respect to step 116.

The fourth sequence includes depositing upper conducting layer 30 on insulating layer 34 (step 150). An exemplary conducting layer 34 is a 0.1 μm thick layer of Al deposited according to any process already described with respect to step 114.

The fourth sequence includes one or more mask-controlled dry etches that produce circular-shaped holes 36 through upper conducting layers 30 and insulating layer 34 (step 152). These dry etches complete fabrication of the field ionizers of multi-layer structure 16. Exemplary dry etches produce holes with diameters of about 0.5–2.0 μm in upper layers 30, 34.

Method 110 also includes a chemical etch that removes sacrificial amorphous silicon from cavities 50, 60 of both the ion traps and the ion detectors (step 154). The chemical etch includes repeated 10-second applications of $XeF_2$ gas at a pressure of about 2.9 Torr to monolithic structure 10 followed by pump outs of produced gases.

EXAMPLE 2

Figure 9:
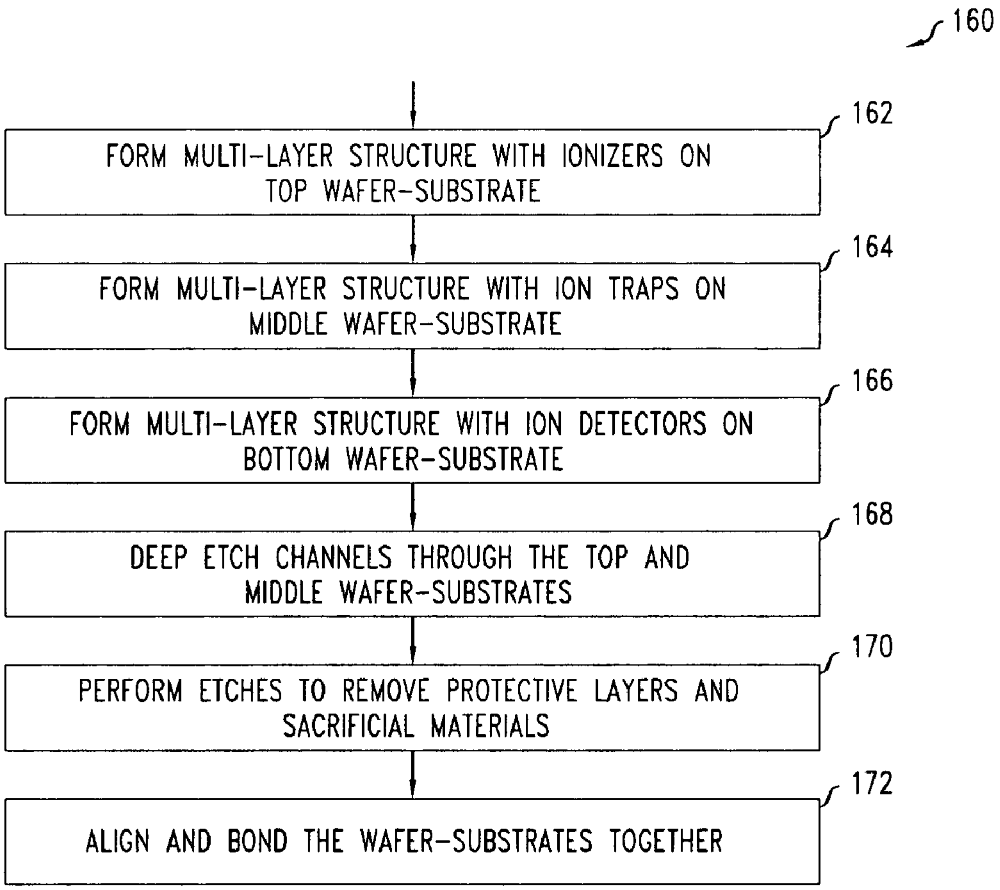
FIG. 9 is a flow chart illustrating a method for fabricating the multiple wafer-substrate module of FIG. 6.

FIG. 9 illustrates a method 160 for fabricating multiple wafer-substrate structure 10" of FIG. 5. For wafer-substrate 82, method 160 includes forming functional multi-layer structure 86, i.e., an array of ionizers, on the front side of the wafer-substrate 82 (step 162). An exemplary process for forming the multi-layer structure 86 includes fabrication steps 146, 148, 150, and 152 of method 110. For wafer-substrate 83, the method 160 includes forming functional multi-layer structure 87, i.e., an array of ion traps, on the front side of the wafer-substrate 83 (step 164). An exemplary process for forming the multi-layer structure 87 includes steps 128, 130, 132, 134, 136, 138, 140, 142, and 144 of method 110. For the wafer-substrate 84, the method 160 includes forming functional multi-layer structure 88, i.e., an array of ion detectors, on the front side of the wafer-substrate 88 (step 166). An exemplary process for forming the multi-layer structure 88 includes fabrication steps 112, 114, 116, 118, 120, 122, 124, and 126 of method 110.

For the wafer-substrates 82, 83, method 160 also includes performing backside processes that produce channels 90, 92 (step 168). Exemplary processes include depositing a protective layer of amorphous silicon on front surfaces of the wafer-substrates 82–83 and include then, mechanically grinding the backsides to thin the wafer-substrates 82–83. For a standard silicon wafer, the grinding may reduce the wafer-substrate thicknesses from about 750 $\mu$m to a thickness of about 300 $\mu$m. The processes also include performing deep etches from the backsides of the thinned wafer-substrates 82–83 to produce the channels 90, 92. The deep etches involve series of alternating shallow plasma etches, e.g., to depths of 2–3 $\mu$m, and polymer depositions. Exemplary conditions for the plasma etches are a reactive gas mixture of $SF_6$ and Ar, a gas flow of less than 100 sccm, a pressure of $10^{-5}$–$10^{-4}$ bar, and a microwave energy of 300–1200 watts at 2.45 GHz for generating the plasma. The polymer depositions produce uniform coatings of fluorocarbons on the partially etched via, e.g., a layer of $CHF_3$. The coatings reduce lateral etching during the subsequent plasma etch. Exemplary conditions for the polymer depositions are a gas mixture of $CHF_3$ and Ar and flow, pressure, and microwave irradiation conditions similar to those of the plasma etches. Processes for such deep etches in Si wafers are described in the incorporated '893 patent and '432 application.

Method 160 includes performing chemical etches to remove the protective layers of amorphous silicon and sacrificial materials used to fabricate structures on wafer-substrates 83, 84 (step 168). For sacrificial amorphous silicon, exemplary conditions for these chemical etches have been described with respect to step 82 of method 70.

After fabrication of wafer-substrates 82–84, method 160 includes aligning and bonding the wafer-substrates 82–84 together to form structure 10" for the mass spectrometer (step 170).

Other embodiments of the invention will be apparent to those of skill in the art in light of the specification, drawings, and claims of this application.

What is claimed is:

1. An apparatus, comprising:
- a semiconductor or dielectric wafer-substrate;
- a first multi-layer structure being located over the wafer-substrate and including one of an ionizer and an electronic ion detector; and
- a second multi-layer structure being located over the wafer-substrate and including an ion trap having entrance and exit ports; and
- wherein the one of an ionizer and an electronic ion detector has a port coupled to one of the ports of the ion trap.

2. The apparatus of claim 1, wherein the first multi-layer structure comprises an array of one of ionizers and electronic ion detectors, the second multi-layer structure comprises an array of ion traps, and the one of ionizers and electronic ion traps have ports coupled to ports of the ion traps.

3. The apparatus of claim 2, further comprising
- a third multi-layer structure located over the wafer-substrate and including a plurality of the other of ionizers and electronic ion detectors; and
- wherein each ion detector and ionizer has a port coupled to a port of one of the ion traps.

4. The apparatus of claim 2, wherein the first multilayer structure comprises:
- first and second conducting layers; and
- a dielectric layer interposed between the conducting layers; and
- wherein a plurality of holes pass through the first multi-layer structure, each hole coupling to an entrance port of one of the ion traps.

5. The apparatus of claim 2, wherein the second multi-layer structure further comprises:
- a stack including top, middle, and bottom conducting layers, the bottom conducting layer being closer to the wafer-substrate than the other conducting layers, the top conducting layer being further from the wafer-substrate than the other conducting layers; and
- wherein the middle conducting layer has an array of cylindrical cavities, each cavity having a port through the top conducting layer and a port through the bottom conducting layer.

6. The apparatus of claim 5, wherein the first multilayer structure comprises:
- first and second conducting layers; and
- a dielectric layer interposed between the conducting layers of the first multi- layer structure; and
- wherein a plurality of holes pass through the first multi-layer structure, each hole coupling to an entrance port of one of the ion traps.

7. The apparatus of claim 3, wherein each ion detector comprises a capacitor having one capacitor plate exposed to an exit port of one of the ion traps.

8. The apparatus of claim 2, wherein the one of ionizers and electronic ion detectors are field ionizers.

9. The apparatus of claim 8, further comprising a processor connected to receive signals indicative of numbers of ions received in said electronic ion detectors and to determine a mass-to-charge ratio of a portion of said ions based on said signals.

10. The apparatus of claim 8, further comprising a device configured to convert a liquid sample into a jet of molecules directed toward a surface of the one of the multi-layer structures including the plurality of ionizers.

11. An apparatus, comprising:
- a first semiconductor or dielectric wafer-substrate comprising a first multi-layer structure thereon, the first multi-layer structure having one of an ionizer and an electronic ion detector therein; and
- a second semiconductor or dielectric wafer-substrate comprising a second multi-layer structure located thereon, the second multi-layer structure having an ion trap with entrance and exit ports; and
- wherein the one of an ionizer and an electronic ion detector has a port coupled to one of the ports of the ion trap.

12. The apparatus of claim 11, wherein the first and second wafer-substrates are bonded together along faces thereof.

13. The apparatus of claim 11, wherein the first multi-layer structure comprises an array of one of ionizers and ion detectors, the second multi-layer structure comprises an array of ion traps, and the one of ionizers and ion detectors have ports coupled to ports of the ion traps.

14. The apparatus of claim 13, further comprising a third multi-layer structure located over a wafer-substrate and comprising an array of the other of ionizers and electronic ion detectors; and wherein each ion detector and ionizer has a port coupled to a port of one of the ion traps.

15. The apparatus of claim 13, wherein the first multilayer structure comprises:

first and second conducting layers; and a dielectric layer interposed between the conducting layers; and wherein a plurality of holes pass through the first multi-layer structure, each hole coupling to an entrance port of one of the ion traps.

16. The apparatus of claim 13, wherein the second multilayer structure further comprises:

a stack including top, middle, and bottom conducting layers, the bottom conducting layer being closer to the second wafer-substrate than the other conducting layers, the top conducting layer being further from the second wafer-substrate than the other conducting layers; and wherein the middle conducting layer has an array of cylindrical cavities, each cavity having a port through the top conducting layer and a port through the bottom conducting layer.

17. The apparatus of claim 14, further comprising a processor connected to receive signals indicative of numbers of ions received in said ion detectors and to determine a mass-to-charge ratio of a portion of said ions based on said signals.

18. The apparatus of claim 14, further comprising a device configured to convert a liquid sample into a jet of molecules directed toward a surface of the one of the multi-layer structures including the array of ionizers.

19. A method, comprising:

fabricating a first multi-layer structure for an array of ionizers or electronic ion detectors on a wafer-substrate;

depositing a layer of sacrificial material on the first multi-layer structure;

planarizing the layer of sacrificial material;

fabricating a second multi-layer structure comprising an array of ion traps over the planarized layer of sacrificial material; and then, removing the sacrificial material.

20. The method 19 further comprising:

fabricating a third multi-layer structure on the second multi-layered structure, the third multi-layered structure having an array of the other of ionizers or electronic ion detectors therein.

21. The method of claim 20, wherein the act of removing causes sacrificial material to be removed from trapping cavities of the ion traps.

22. A method, comprising:

fabricating a multi-layer structure for an array of ionizers or electronic ion detectors on a first wafer-substrate;

fabricating a multi-layer structure comprising an array of ion traps on a second wafer-substrate; and then, putting the wafer-substrates together such that ports of the ion traps are coupled to ports of the ionizers or electronic ion detectors.

23. The method 22 further comprising:

fabricating a third multi-layer structure having an array of the other of ionizers or electronic ion detectors therein; and wherein the third multi-layer structure is located such that ports of the other of ionizers or electronic ion detectors are coupled to ports of the ion traps.

24. The method of claim 23, further comprising:

etching deep vias in backsides of the second wafer-substrate such that the vias couple to ports of the ion traps.

* * * * *